United States Patent [19]
Moore et al.

[11] Patent Number: 6,051,446
[45] Date of Patent: Apr. 18, 2000

[54] THIN LIQUID CRYSTAL TRANSDUCER PIXEL CELL HAVING SELF-ALIGNED SUPPORT PILLARS

[75] Inventors: Paul M. Moore, Burlingame; Rashid Bashir, Mountain View, both of Calif.

[73] Assignee: National Semiconductor Corporation, Santa Clara, Calif.

[21] Appl. No.: 09/058,623

[22] Filed: Apr. 9, 1998

[51] Int. Cl.[7] .......................... M01L 21/00; M01L 27/84
[52] U.S. Cl. ............................ 438/36; 438/158; 438/160
[58] Field of Search ................................ 438/30, 36, 151, 438/152, 158, 160, 462

[56] References Cited

U.S. PATENT DOCUMENTS

| | | | |
|---|---|---|---|
| 3,746,785 | 7/1973 | Goodrich | 350/3.62 |
| 4,185,894 | 1/1980 | Hilton et al. | 350/338 |
| 4,999,619 | 3/1991 | Velde | 340/784 |
| 5,473,448 | 12/1995 | Yoshinaga et al. | 359/51 |
| 5,557,534 | 9/1996 | Wu | 364/491 |
| 5,677,201 | 10/1997 | Kozuka et al. | 437/3 |
| 5,706,067 | 1/1998 | Colgan et al. | 349/114 |
| 5,764,324 | 6/1998 | Lu et al. | 349/113 |
| 5,838,715 | 11/1998 | Corizine et al. | 372/96 |
| 5,930,591 | 7/1999 | Huang | 438/36 |

OTHER PUBLICATIONS

Colgan, E.G., et al., "*On–Chip Metallization Layers for Reflective Light Valves*", IBM J. Res. Develop. vol. 42, No. May/Jul. 3/4, 1998, pp. 339–345.

Takayama, S., et al., "*Effects of Y or Gd Additon on the Structures and Resistivities of Al Thin Films*", J. Vac. Sci. Technol. A 14(4), Jul./Aug. 1996, pp. 2499–2504.

Takayama, S., et al., "*Low Resistivity Al–RE (RE=La, Pr, and Nd )Alloy Thin Films with High Thermal Stability for Thin–Film–Transistor Interconnects*", J. Vac. Sci. Technol. B 14(5), Sep./Oct. 1996, pp. 3257–3262.

O'Hara, A., et al., "*Planarisation of Spatial Light Modulator Silicon Back–Planes Using Chemical–Mechanical Polishing*", 1994 The Institution of Electrical Engineers, publishes by IEE, Savoy Place, London WC2R OBL. UK, pp. 5/1–5/6, month unknown.

Castleberry, D. E., et al., "*A 1 Mega–Pixel Color a–Si TFT Liquid–Crystal Display*", SID 88 Digest, First Ed., May 1987, ISSN 0097–966X, pp. 232–234.

Glueck, J., et al., "*Color–TV Projection with Fast–Switching Reflective HAN–Mode Light Valves*", SID 92 Digest, ISSN 0097–0966X, p. 277280, May 1992.

*Primary Examiner*—John F. Niebling
*Assistant Examiner*—Michael S. Lebentritt
*Attorney, Agent, or Firm*—Limbach & Limbach, L.L.P.

[57] ABSTRACT

A liquid crystal transducer pixel cell includes support pillars separating a top and bottom plate of the cell. During the process for forming the pixel cell, the support pillars are formed prior to formation of the pixel electrode. This process flow obviates the need for depositing a thick dielectric layer on top of the pixel electrode. This process flow also prevents exposure of the surface of the pixel electrode to etching during subsequent processing, preserving the reflectance of the pixel cell electrode. Finally, the process flow in accordance with the present invention eliminates the creation of keyhole voids within the support pillars by forming the support pillars over a flat upper level intermetal dielectric rather than over narrow trenches formed in the pixel electrode layer.

8 Claims, 13 Drawing Sheets

THIN LIQUID CRYSTAL TRANSDUCER PIXEL CELL HAVING SELF-ALIGNED SUPPORT PILLARS

BACKGROUND OF THE INVENTION

1. Field of the Invention

The present invention relates to light valves, and in particular, to light valves utilizing thin liquid crystal transducer pixel cells having self- aligned pillars for supporting the top glass substrate.

2. Description of the Related Art

Liquid crystal displays (LCDs) are becoming increasingly prevalent in high-density projection display devices. These display devices typically include a light source which passes light through a light valve.

One of the methods for producing colors in a liquid crystal display is to sequentially project light having a wavelength corresponding to a primary color onto a single light valve. Color sequential light valves create a spectrum of color within the range of the human perception by switching between a set of discrete primary colors. Typically, red, green, and blue are the primary tri-stimulus colors used to create the remaining colors of the spectrum.

Specifically, during projection of each primary color, the light intensity is modulated such that combination of the intensities of the primary colors in sequence produces the desired color. The frequency of switching between the primary wavelengths by the light valve should be sufficiently rapid to render discrete primary states indistinguishable to the human eye. Two factors dictate the minimum frequency necessary for switching.

The first factor is the ability of the human eye to detect the discrete primary colors (e.g., red, green, blue). At slower than ideal switching speeds, the human eye will detect a flicker and the primaries may not blend.

The second factor determining the frequency of switching is the video refresh rate. During display of video images, the individual frames must be refreshed at frequencies undetectable to the human eye.

The net frequency of switching demanded by the combination of sequential color blending and video refreshing is beyond the capabilities of light valves that utilize thick (>1 $\mu$m) liquid crystal (LC) transducers. However, thin (<1 $\mu$m) liquid crystal transducers have been successfully fabricated. These thin LC transducers demonstrate adequate color sequential blending at video refresh rates. One example of such a thin LC transducer pixel cell structure is disclosed in U.S. Pat. No. 5,706,067, to Colgan et al.

In general, the conventional thin LC transducer pixel cells possess enhanced responsiveness due to the decreased volume of liquid crystal material between the top and bottom plates. A smaller volume enables the liquid crystal to shift orientation more quickly and in response to a lower applied voltage.

FIG. 1A shows a top view of a conventional thin LC transducer pixel cell. FIG. 1B shows a cross-sectional view of the thin liquid crystal transducer along line A–A' of FIG. 1A. FIG. 1C shows a cross-sectional view of the thin liquid crystal transducer along line B–B' of FIG. 1A.

Thin LC transducer pixel cell 100 comprises a layer of liquid crystal (LC) material 102 sandwiched between a top plate 104 and a bottom plate 106. Top plate 104 is physically supported and separated from bottom plate 106 by a support pillar 105. Top plate 104 is a translucent material, typically glass. Bottom plate 106 is a reflective pixel electrode layer.

Pixel electrode layer 106 actually consists of two layers: a thick metal layer 108 on top of a thin adhesion layer 110. Pixel electrode layer 106 is delineated into individual pixel electrodes 130 by intervening trenches 118.

Pixel electrode layer 106 lies on top of an upper intermetal dielectric layer 112 that is one component of an interconnect scheme. The interconnect overlies a capacitor structure formed within an underlying silicon substrate (not shown). Upper intermetal dielectric layer 112 electrically insulates pixel electrode 130 from lower metallization layer 114. The underlying capacitor structure is in electrical communication with pixel electrode 130 through metal-filled via 116.

FIGS. 2AA–2EC illustrate the conventional process for forming a thin LC transducer pixel cell. For purposes of convention, all FIGS. 2_A illustrate a top view of the pixel cell, all FIGS. 2_B illustrate a cross-sectional view of the pixel cell along line A–A' of the FIG. 2_A, and all FIGS. 2_C illustrate a cross-sectional view of the pixel cell along line B–B' of the FIG. 2_A. FIGS. 2AA–2AC illustrate the starting point for the conventional process for fabricating a thin LC transducer pixel cell. Starting structure 200 is created by forming an upper intermetal dielectric layer 212 over a lower interconnect metallization layer 214. A central portion of upper intermetal dielectric layer 212 is then etched to form via 216. A liner (not shown) typically composed of a Ti/TiN layer combination, is then formed on the walls of via 216, and via 216 is filled with metal (typically CVD Tungsten). Excess metal is then removed from the surface of upper dielectric layer 212, typically by a combination of etching and chemical-mechanical polishing (CMP).

FIGS. 2BA–2BC illustrate formation of the pixel electrode in accordance with the conventional process. Pixel electrode layer 206 is formed over the entire surface of the pixel cell. Pixel electrode layer 206 actually consists of three separate layers. Pixel electrode 206 is formed by the deposition of a thin Ti film 210, followed by the deposition of metal layer 208, typically an Al/Cu mixture. A passivation film 220 is then formed on top of metal layer 208. Although it is not shown in FIGS. 2BA–2BC, the presence of via 216 underlying pixel electrode layer 206 creates a slight dimple in the surface of pixel electrode layer 206.

FIGS. 2CA–2CC illustrate delineation of pixel electrode layer 206 into discrete electrodes of individual pixel cells in accordance with the conventional process. During this step, a photoresist mask is patterned over pixel electrode layer 206, and then pixel electrode layer 206 is etched to form a plurality of intersecting trenches 218. Intersecting trenches 218 in turn define a plurality of pixel cell electrodes 230.

FIGS. 2DA–2DC illustrate the first step of forming support pillars in accordance with the conventional process. In this first step, a thick dielectric layer 232 (typically $SiO_2$ or $Si_3N_4$) is deposited at high temperatures (300 to 400° C.) over the entire surface of the pixel cell, including trenches 218. Because trenches 218 are relatively narrow, dielectric material is typically deposited at a faster rate at the corners of trenches 218. Uneven deposition of dielectric material within trenches 218 may be further exacerbated when the trench exhibits a re-entrant side wall profile. The uneven deposition rate of dielectric material ultimately gives rise to formation of keyhole voids 234 within trenches 218.

FIGS. 2EA–2EC illustrate the second step of forming support pillars in accordance with the conventional process. In this second step of pillar formation, a pattern of photoresist is deposited on top of thick dielectric layer 232. Thick dielectric layer 232 is then etched to form support pillars 205. Because of the necessity of etching through all of thick dielectric layer 232, TiN film 220 and some portion of metal layer 208 are also typically exposed to etchant during this step.

Fabrication of thin LC transducer pixel cell is completed by forming an alignment surface (not shown) for the LC material positioned on top of the pixel electrode. Forming this alignment surface is a two step process. First, a dielectric film (typically polyimide) is deposited on top of the pixel electrode. Second, the dielectric film is scored by a rubbing wheel, which traverses the surface of the pixel cell and gouges the alignment surface in a uniform direction. Liquid crystal material is then placed within the cell, and a top glass plate is secured to the tops of the support pillars.

The conventional fabrication process described above is adequate to produce functional thin LC transducer pixel cells. However, the conventional process flow suffers from a number of serious disadvantages.

One problem is that the step of depositing thick dielectric layer 232 on top of pixel electrode layer 206 as shown in FIGS. 2DA–2DC produces hillocks in the metal layer 208. These hillocks are due to the forces exerted by the thick dielectric layer from which the support pillar are formed. Specifically, there is a tensile stress present in the metal layer of the pixel electrode. Exposure of the metal layer to the heat of the dielectric's deposition will induce a relaxation of the metal surface and create hillocks. These hillocks render the surface of the pixel electrode uneven, degrading the reflectance of the pixel cell.

Therefore, there is a need in the art for a process of forming a thin LC transducer pixel cell having support pillars that does not require the deposition of a thick dielectric layer directly on top of the pixel electrode.

A second problem associated with the conventional method is that the step of etching the thick dielectric layer 232 from the surface of the pixel electrode layer 206 as shown in FIGS. 2EA–2EC also degrades reflectance of the pixel electrode. When pixel electrode layer 206 is freshly deposited as shown in FIGS. 2BA–2BC, pixel electrode layer 206 is extremely smooth and exhibits high reflectance. However, etching of the dielectric layer to form the support pillars as shown in FIGS. 2DA–2DC can roughen and/or oxidize the surface of the pixel electrode layer, lowering its reflectance.

Therefore, there is a need in the art for a process of forming a thin LC transducer pixel cell having support pillars that does not etch or roughen the surface of the pixel electrode.

A third problem associated with the conventional method is the formation of keyhole voids 234 as shown in FIGS. 2DB–2DC. Because of the narrow width of trenches 218, thick dielectric layer 232 is typically deposited at a faster rate along the corners of trenches 218. This differential rate of deposition ultimately promotes formation of keyhole voids 234 within support pillars 205. Keyhole voids 234 can weaken the structural integrity of the support pillars 205. Weakening of the support pillars 205 by keyhole voids 234 can be especially problematic during subsequent formation of the LC alignment surface, as the rubbing wheel utilized to score the alignment surface can contact the support pillars, subjecting them to high stress.

Therefore, there is a need in the art for a process for fabricating a thin LC transducer pixel cell that eliminates the formation of keyholes inside of the support pillars as described above.

SUMMARY OF THE INVENTION

The present invention relates to a thin liquid crystal transducer pixel cell including a top and bottom plate separated by support pillars, and a process for fabricating such a liquid crystal transducer. The process flow in accordance with the present invention includes the formation of support pillars prior to the deposition of the pixel electrode. This specific sequence of steps obviates the need to deposit a thick dielectric layer on top of the pixel electrode. This process sequence also prevents exposure of the surface of the pixel electrode to etching during formation of the support pillars. Finally, the process sequence in accordance with the present invention eliminates the unwanted formation of keyhole voids that could structurally weaken the pillar structures.

A method of forming an array of thin liquid crystal transducer pixel cells in accordance with one embodiment of the present invention includes the steps of (1) forming a series of support pillars on top of an upper level of intermetal dielectric, (2) forming a pixel electrode layer on top of the support pillars and the upper level of intermetal dielectric, and then (3) forming a series of trenches in the pixel electrode layer to delineate individual pixel cell electrodes of pixel cells within the array.

The features and advantages of the present invention will be understood upon consideration of the following detailed description of the invention and the accompanying drawings.

DETAILED DESCRIPTION

During fabrication of a thin LC transducer pixel cell in accordance with the present invention, support pillars are formed on top of the highest intermetal dielectric prior to formation of the pixel electrode. Subsequent formation of the pixel electrode creates a self-aligned structure that can then be etched to expose the support pillar. This process flow obviates the need for depositing a thick dielectric layer on top of the pixel electrode. This process flow also avoids exposing the surface of the pixel electrode to etching during formation of the support pillars. Finally, this process sequence also prevents the unwanted formation of keyhole voids within the support pillars.

Figure 3A:
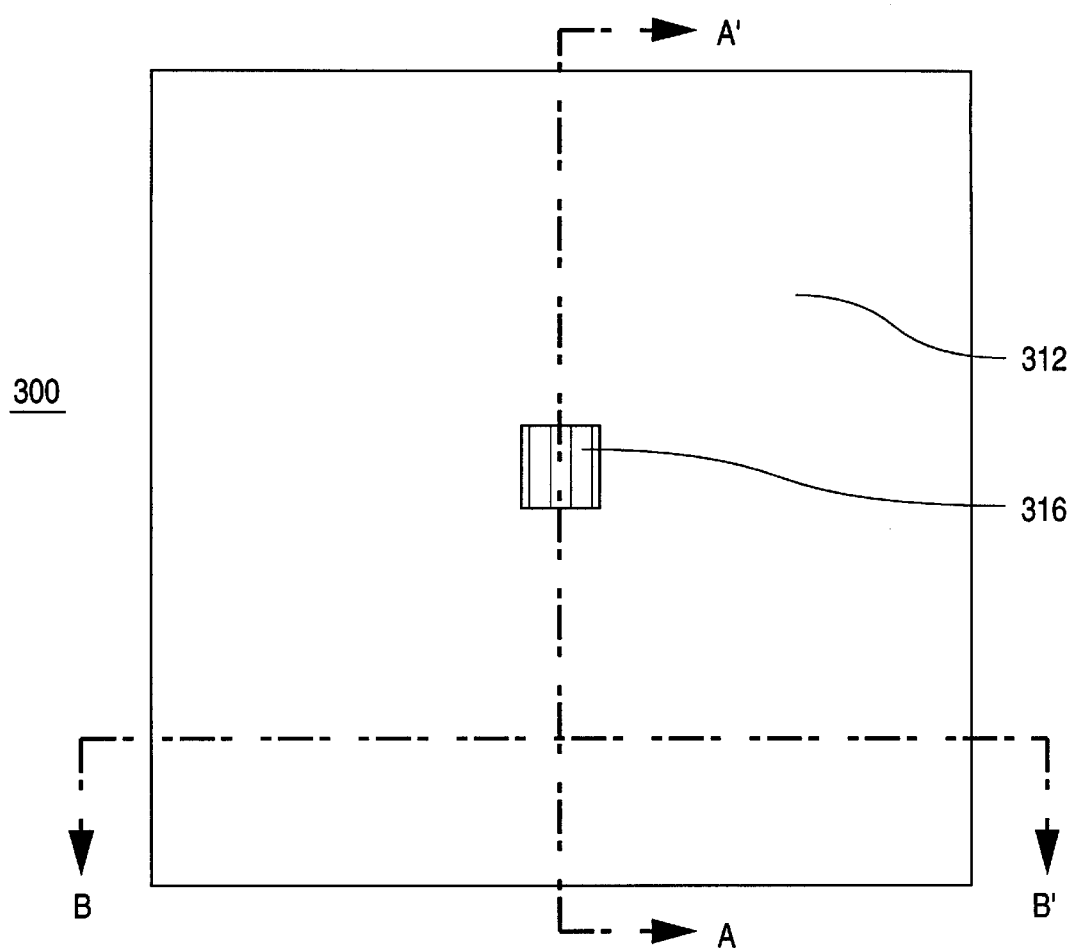
FIGS. 3AA–3GC show top and cross-sectional views of the process steps for forming a thin LC transducer pixel cell in accordance with a first embodiment of the present invention.
Figure 3A:
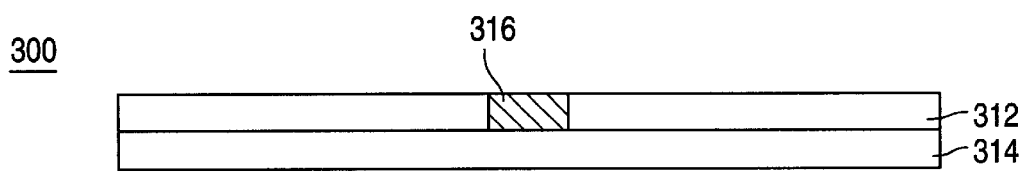
Figure 3A:
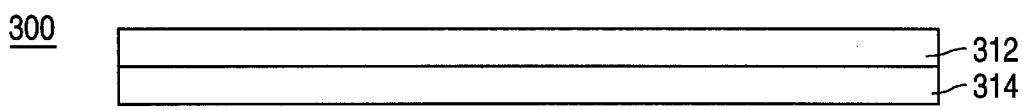

FIGS. 3AA–3GC illustrate the process for forming a thin LC transducer pixel cell in accordance with a first embodiment of the present invention. For purposes of convention, all FIGS. 3_A illustrate a top view of the pixel cell, all FIGS. 3_B illustrate a cross-sectional view of the pixel cell along line A–A' of the FIG. 3_A, and all FIGS. 3_C illustrate a cross-sectional view of the pixel cell along line B–B' of the FIG. 3_A.

Figure 1A:
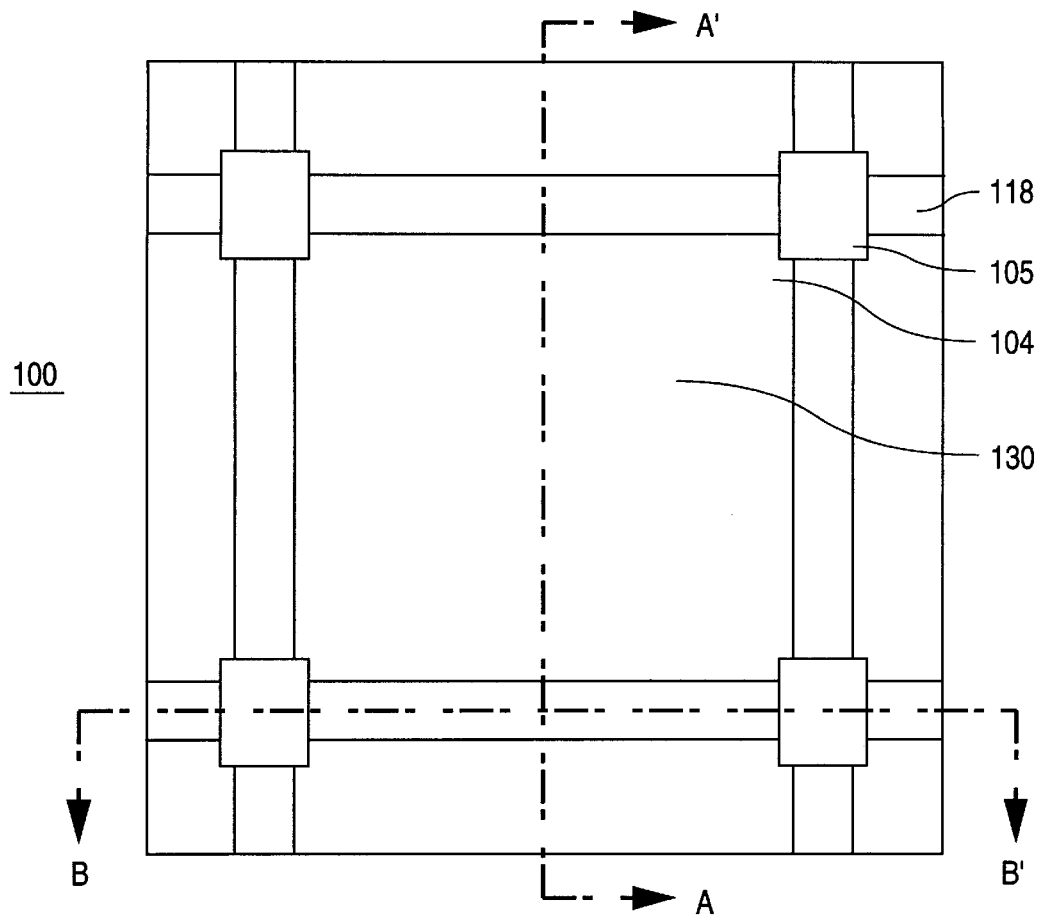
FIG. 1A shows a top view of a conventional thin LC transducer pixel cell.
Figure 1B:
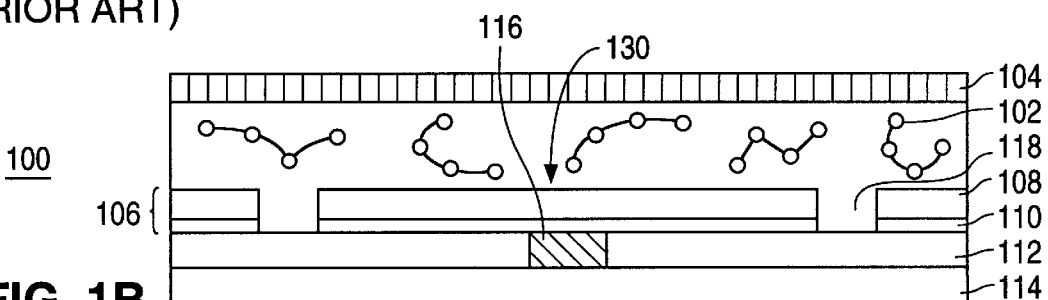
FIG. 1B shows a cross-sectional view of the thin LC transducer pixel cell along line A–A' of FIG. 1A.
Figure 1C:
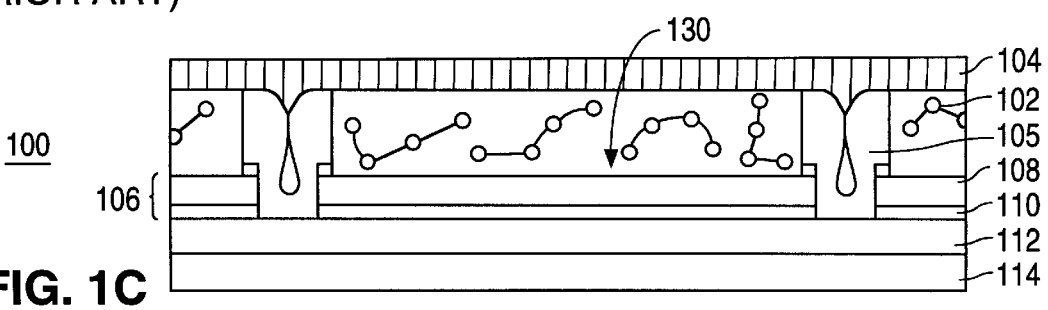
FIG. 1C shows a cross-sectional view of the thin LC transducer pixel cell along line B–B' of FIG. 1A.
Figure 2A:
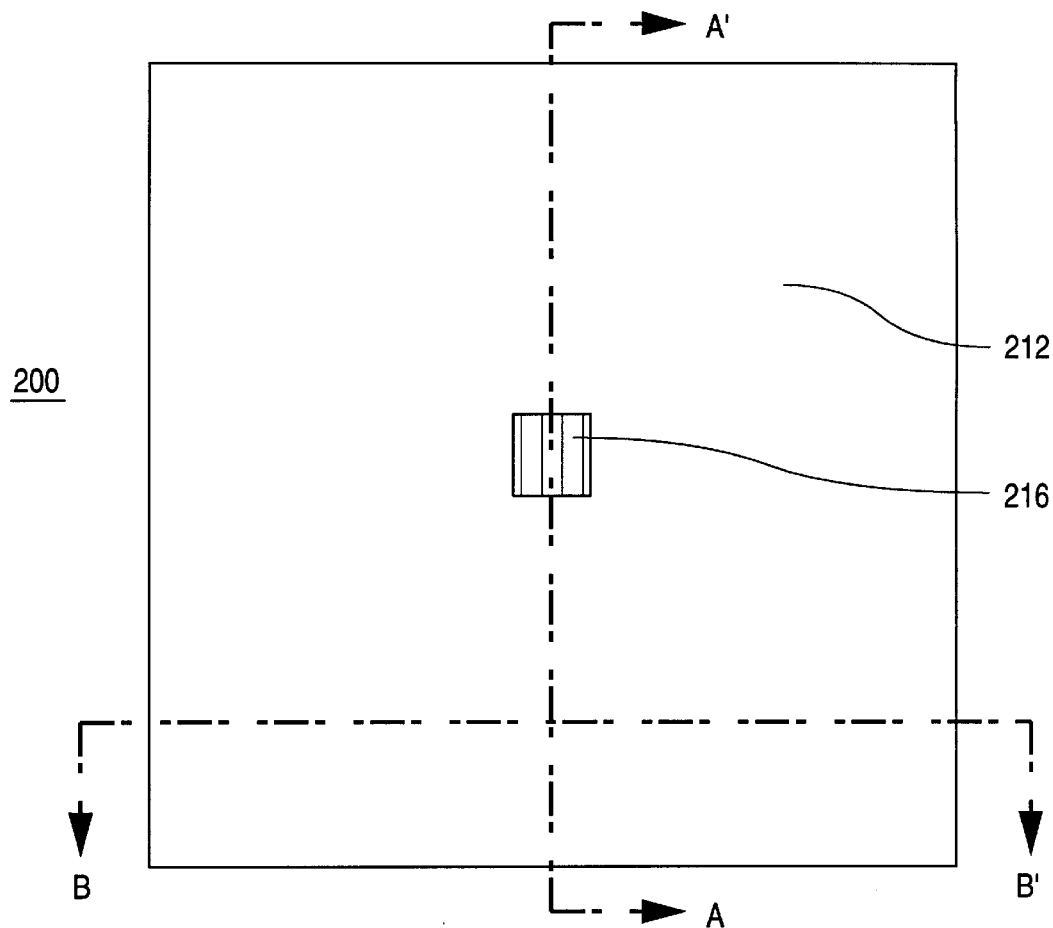
FIGS. 2AA–2EC show top and cross-sectional views of the conventional process steps for forming a thin LC transducer pixel cell.
Figure 2A:
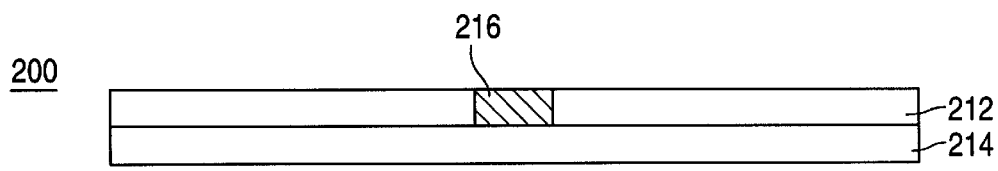
Figure 2A:
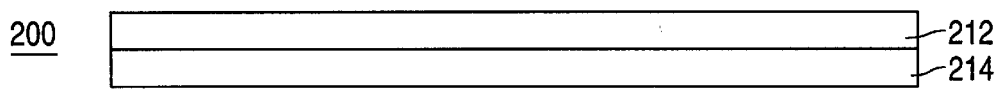
Figure 2B:
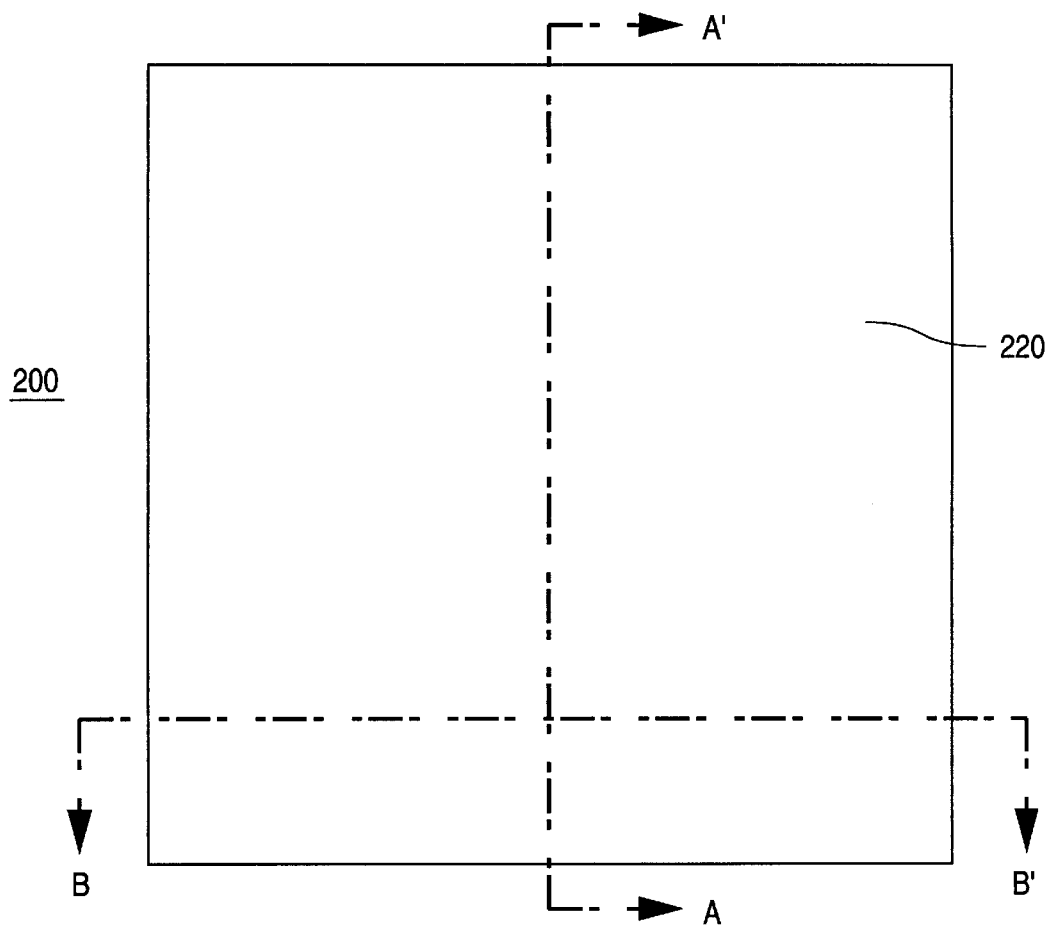
Figure 2B:
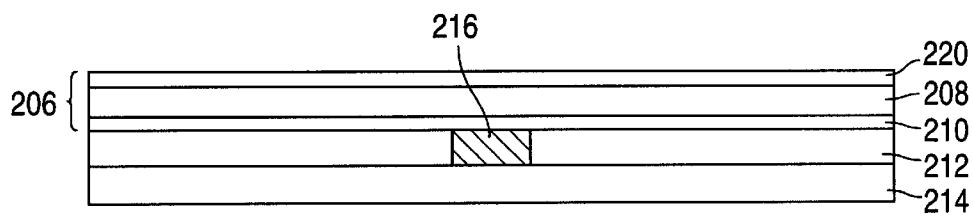
Figure 2B:
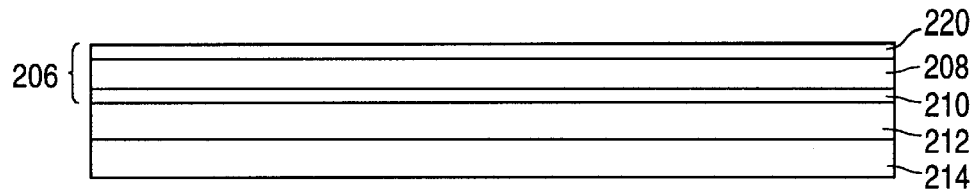
Figure 2C:
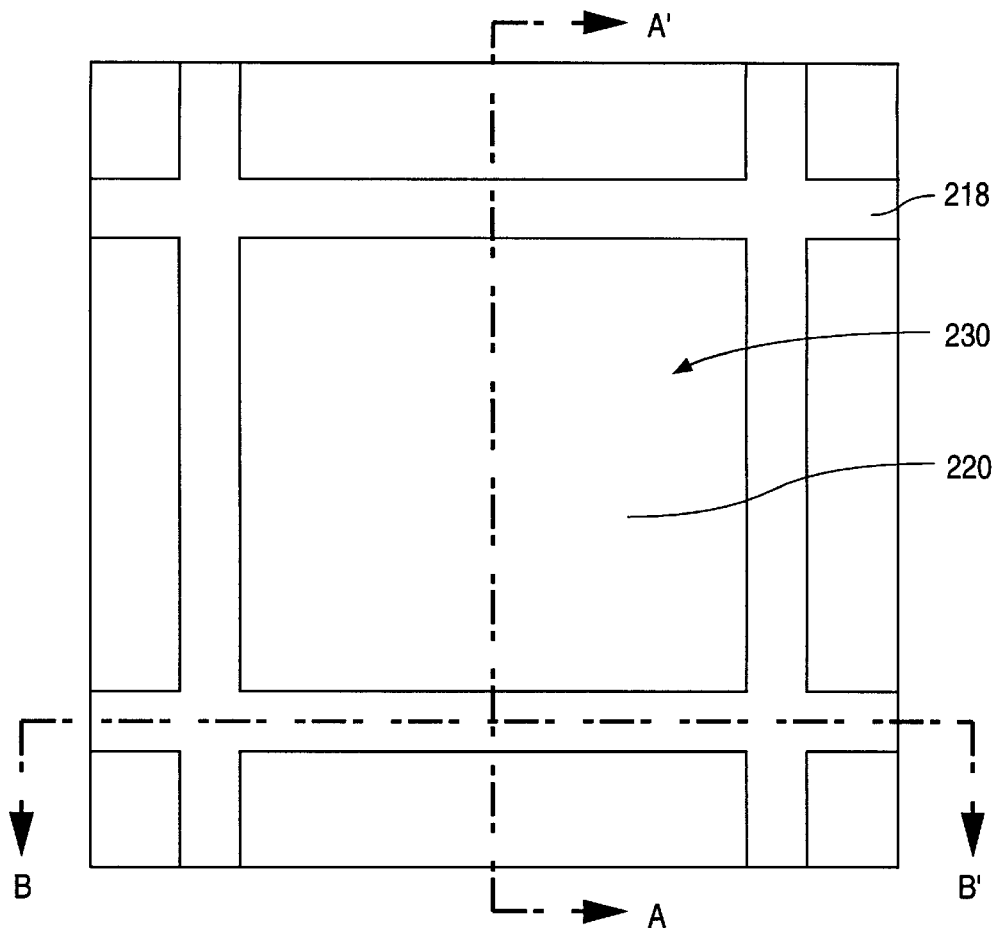
Figure 2C:
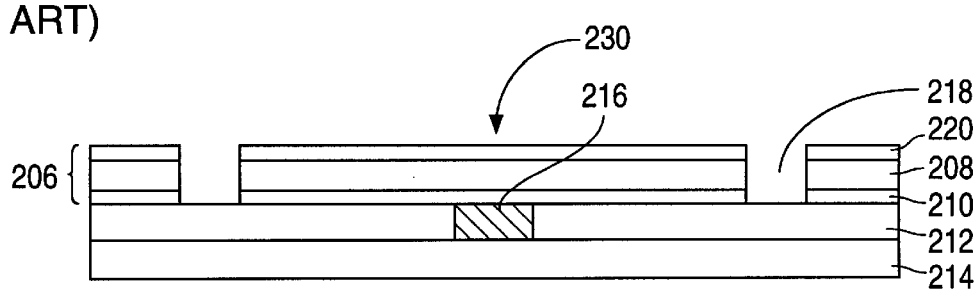
Figure 2C:
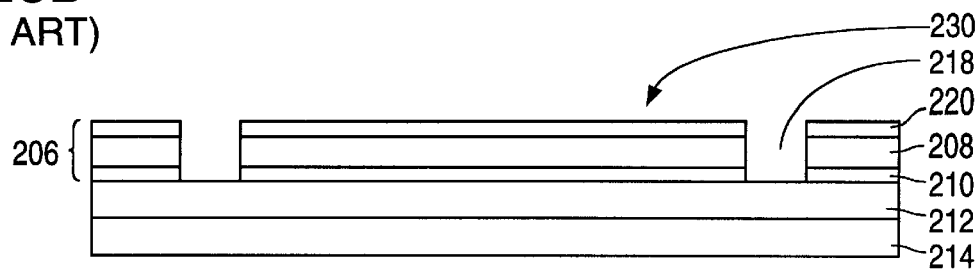

FIGS. 3AA–3AC, identical to prior FIGS. 2AA–2AC, illustrates the starting point for the process of forming the thin LC transducer pixel cell. Starting structure 300 is created by forming an upper intermetal dielectric layer 312 over a lower interconnect metallization layer 314. A central portion of upper intermetal dielectric layer 312 is then etched to form a via 316. A liner (not shown) typically composed of a Ti/TiN layer combination, is then formed on the walls of via 316, and via 316 is filled with metal (typically CVD Tungsten). Excess metal is then removed from the surface of the upper intermetal dielectric 312, typically by a combination of etching and chemical-mechanical polishing (CMP).

Figure 3B:
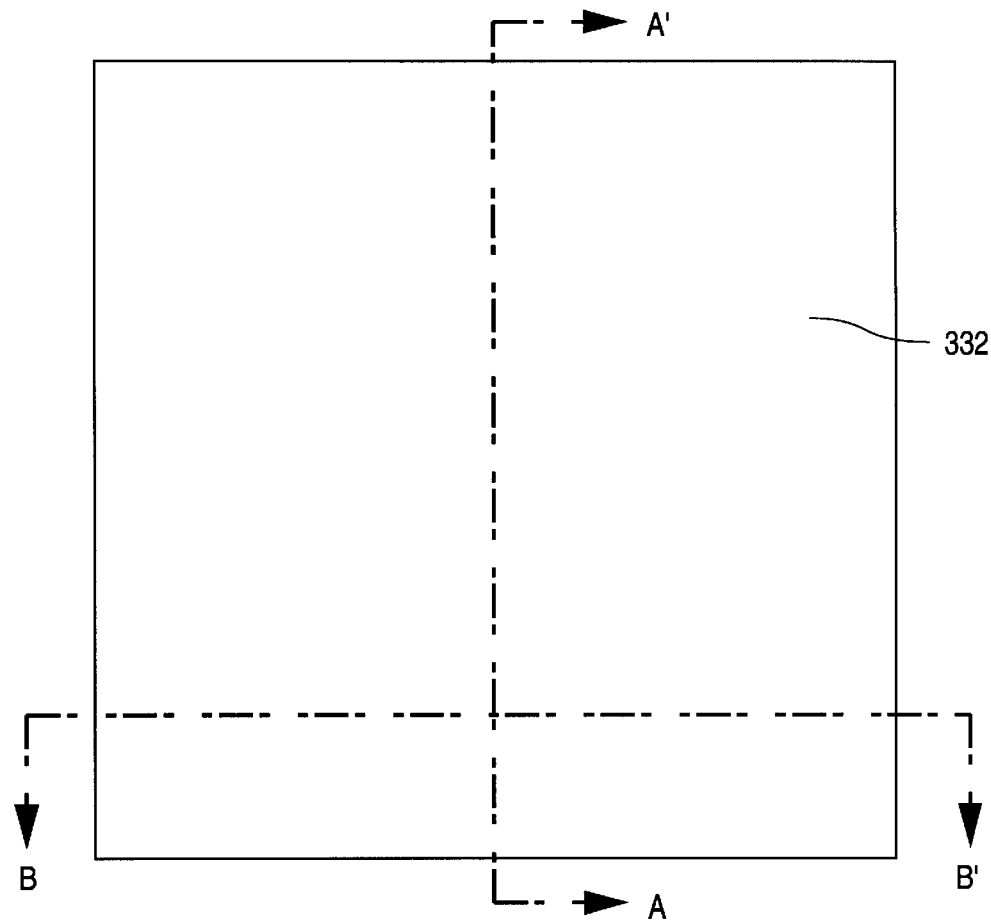
Figure 3B:
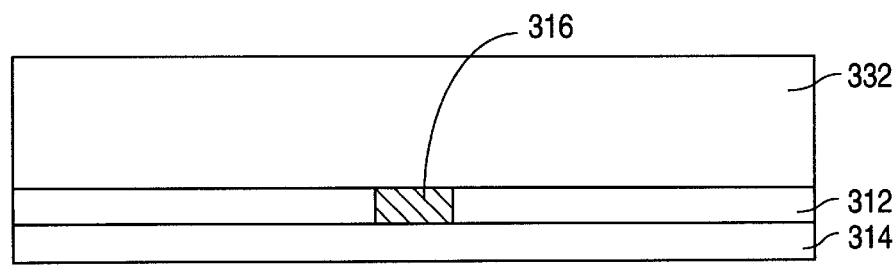
Figure 3B:
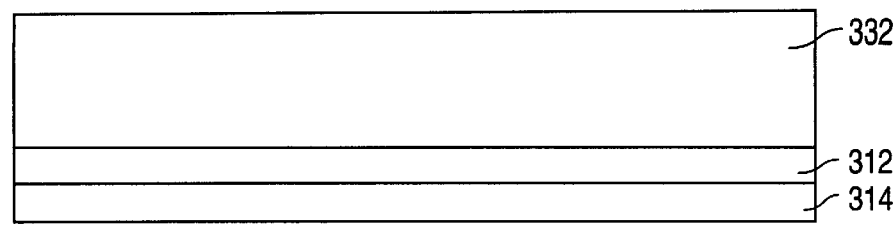

FIGS. 3BA–3BC illustrate the initial formation of support pillars in accordance with a first embodiment of the process in accordance with the present invention. In this initial pillar formation step, a thick (approx. 15,000 Å) layer of $Si_3N_4$ 332 is deposited over the entire surface of the pixel cell.

Figure 3C:
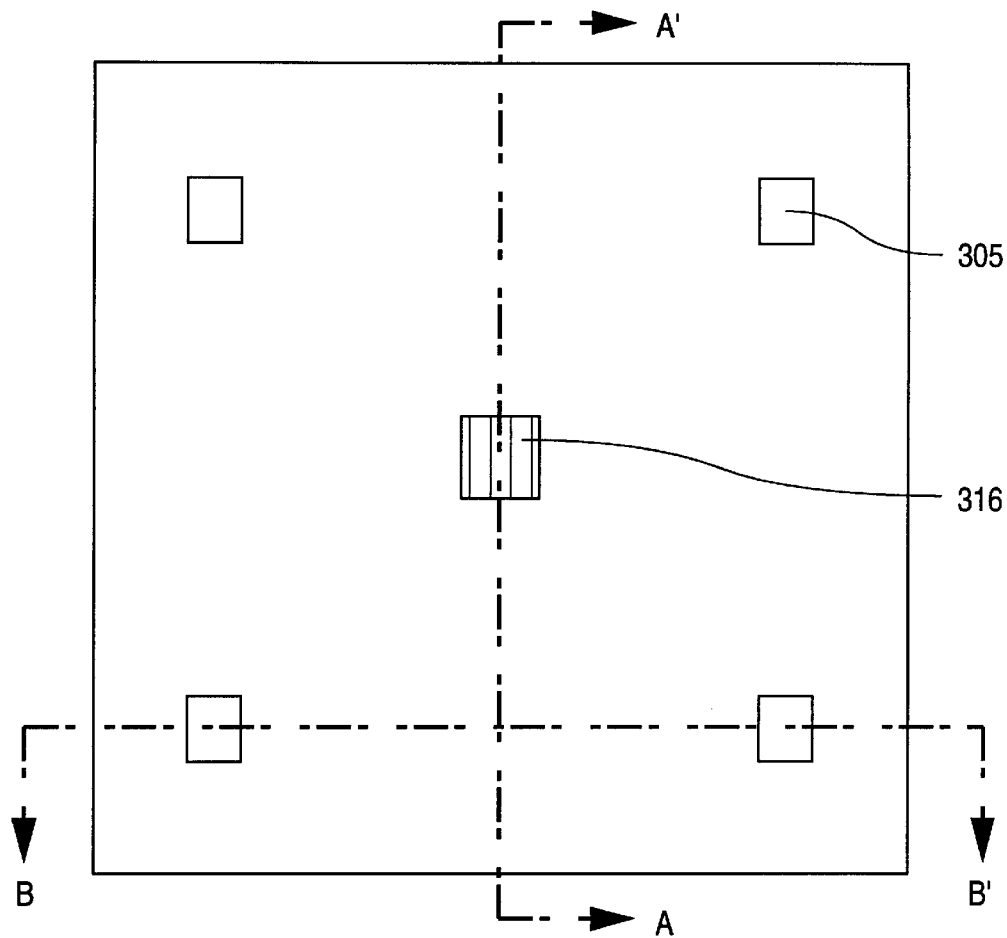
Figure 3C:
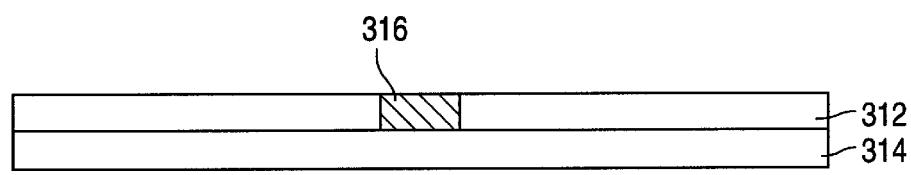
Figure 3C:
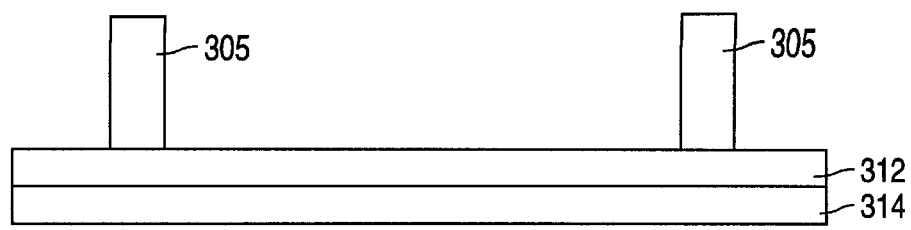

FIGS. 3CA–3CC illustrate the second step of forming support pillars in accordance with the process of the present invention. In this second step, a photoresist mask is patterned on top of thick $Si_3N_4$ layer 332. Thick $Si_3N_4$ layer 332 is then etched to form support pillars 305.

Figure 3D:
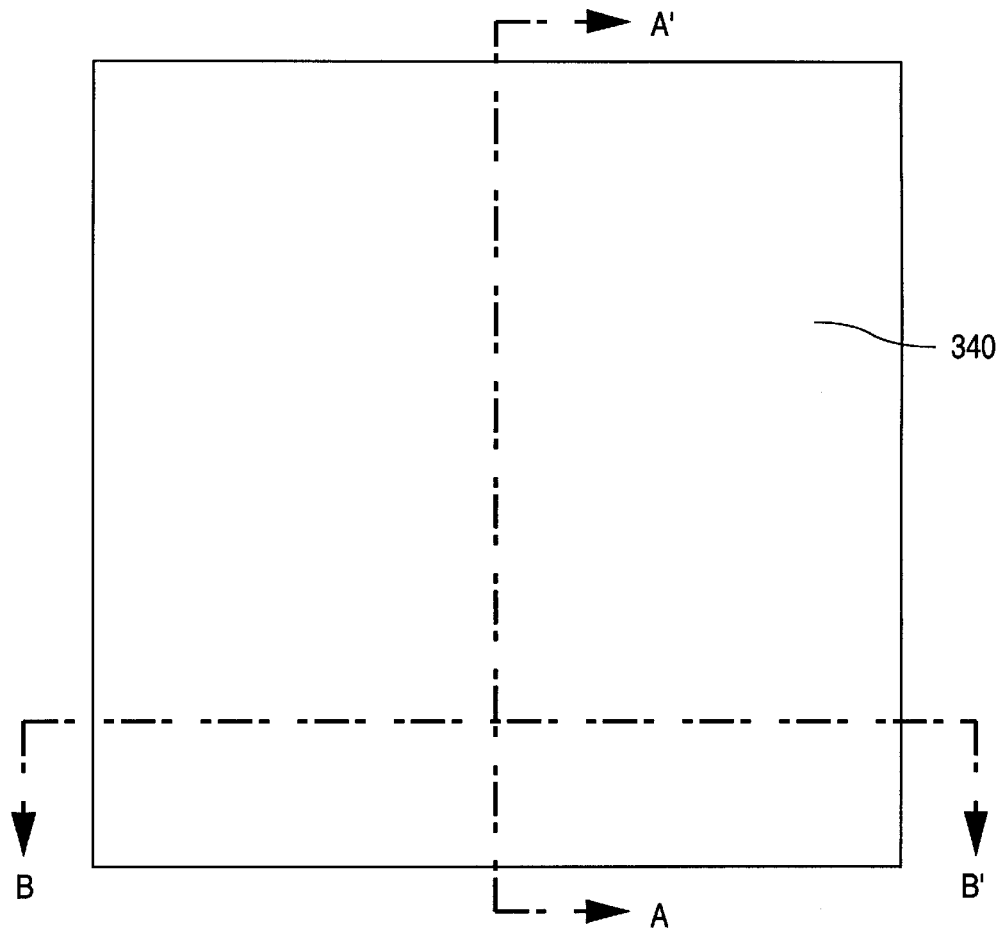
Figure 3D:
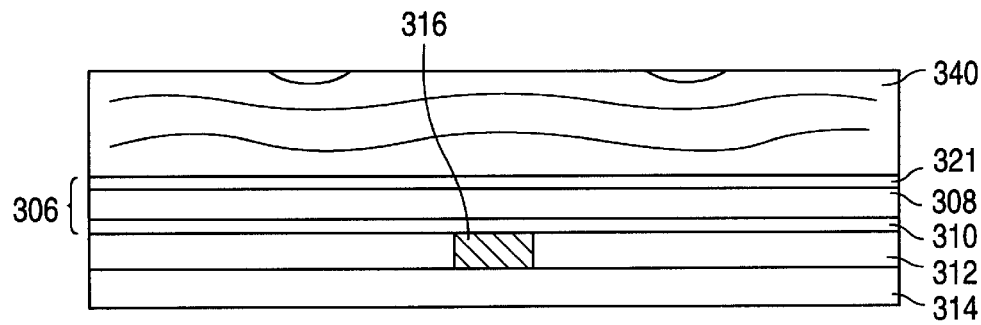
Figure 3D:
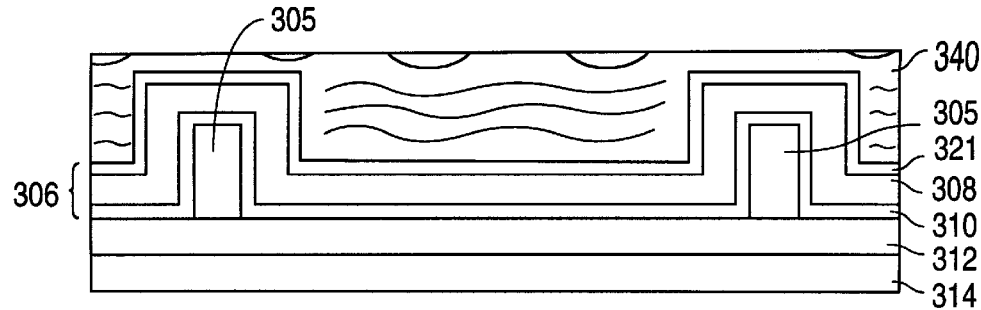

FIGS. 3DA–3DC illustrate the formation of the reflective pixel electrode in accordance with the first embodiment of the present invention. Pixel electrode layer 306 is formed over the entire surface of the pixel cell, including support pillars 305.

Pixel electrode layer 306 is actually composed of three separate layers. Thin (approx. 300 Å) Ti film 310 is formed first, followed by a thicker (approx. 500–5000 Å) Al/Cu layer 308. Thin Ti film 310 serves as an adhesive to retain Al/Cu layer 308 in contact with the underlying upper intermetal dielectric layer 312.

Next, a thin (1600 Å) film of $SiO_2$ 321 is formed on top of Al/Cu layer 308. $SiO_2$ film 321 serves to protect underlying metal layer 308 from roughening during subsequent etching steps. $SiO_2$ film 321 also serves to enhance the reflectance of the pixel electrode. By tuning the thickness of $SiO_2$ film 321 to promote constructive interference of light rays reflected off of the underlying Al/Cu layer 308, $SiO_2$ film 321 can endow pixel cell electrode layer 306 with greater reflectance than with an exposed Al/Cu metal layer 308 alone. However, in order to effectively accomplish such constructive interference, the surface of $SiO_2$ film 321 must remain smooth and unaffected by subsequent etching processes.

After the formation of pixel electrode layer 306, a thick (approx. 15,000 Å) layer of photoresist 340 is then formed over the entire surface of the pixel cell.

Figure 3E:
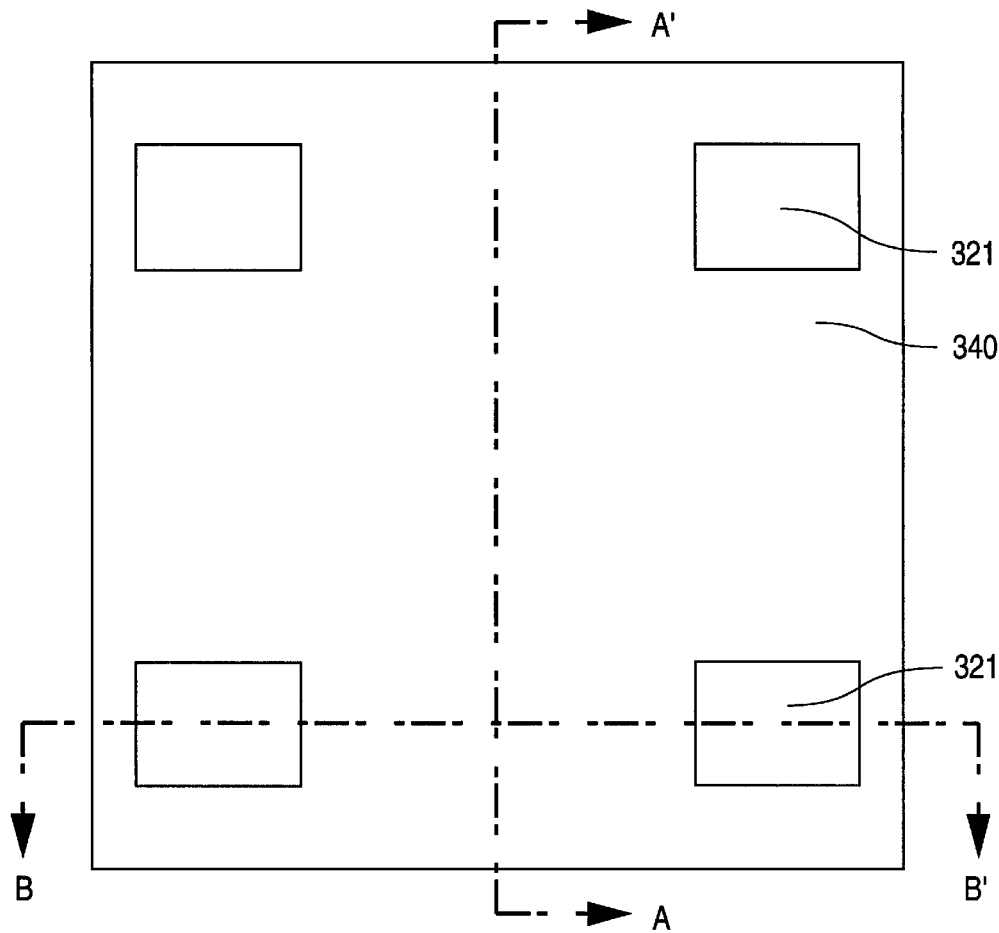
Figure 3E:
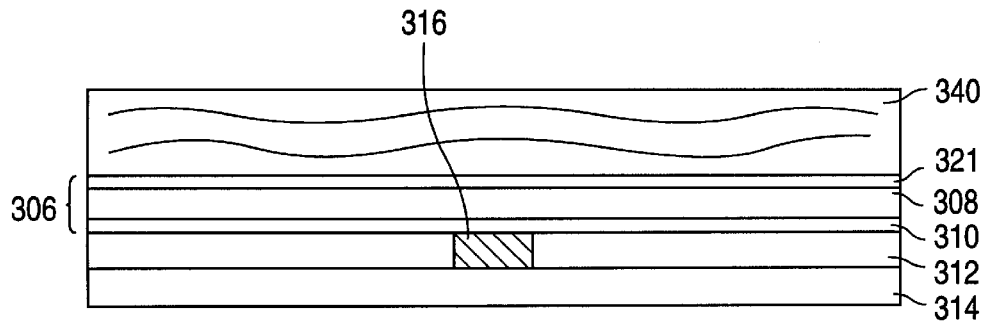
Figure 3E:
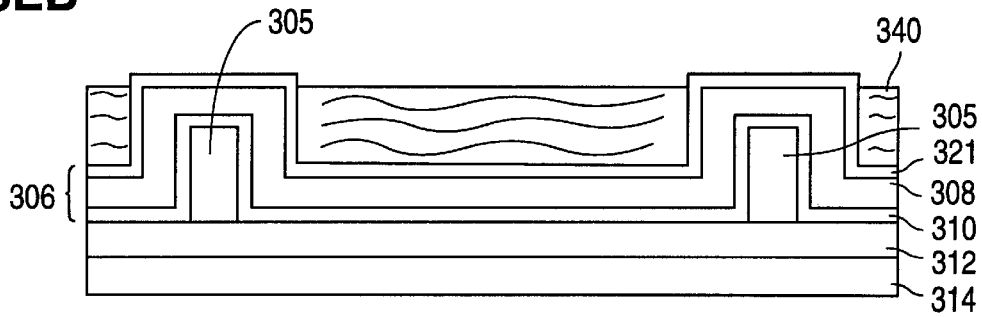

FIGS. 3EA–3EC illustrate the self-aligned nature of the current process. During this step, thick photoresist layer 340 is reflowed at 130–150° C. for 15–30 min, followed by an etch-back of approximately 1600 Å of the resist, leaving approximately 13,400 Å remaining. This etch back step thus exposes a portion of $SiO_2$ film 321 on top of support pillar 305.

Figure 3F:
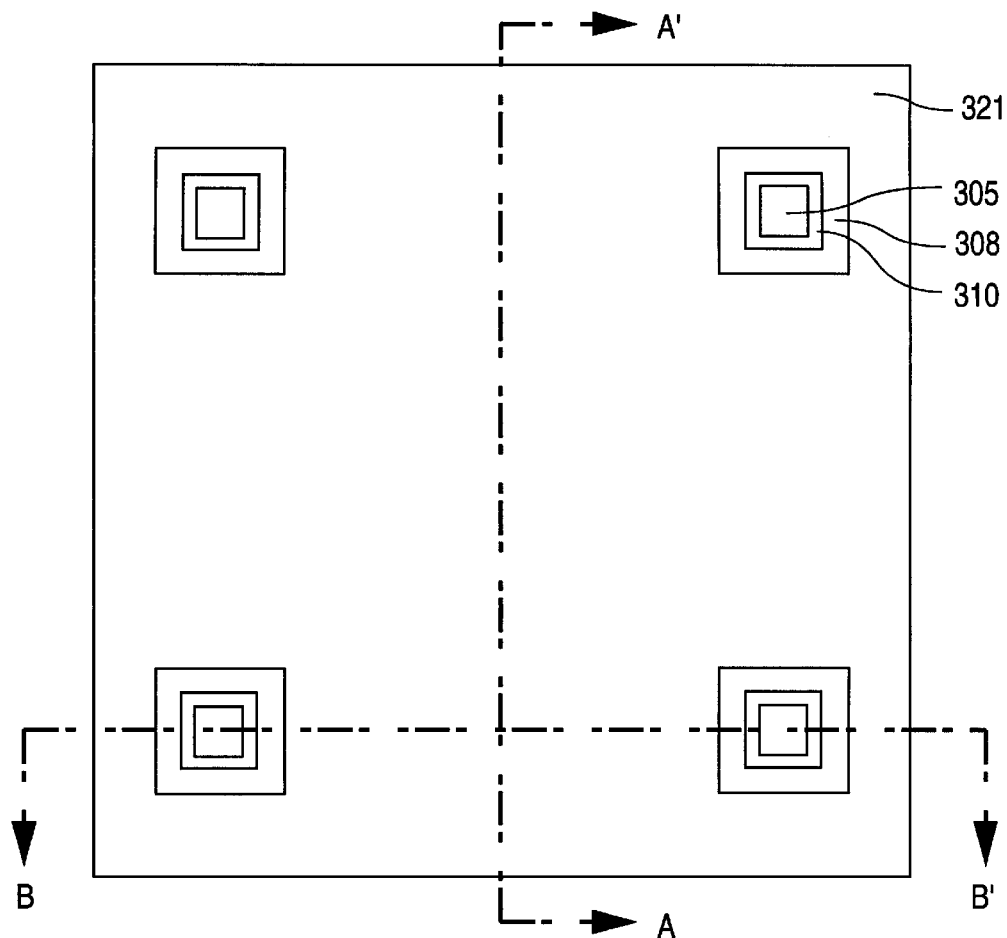
Figure 3F:
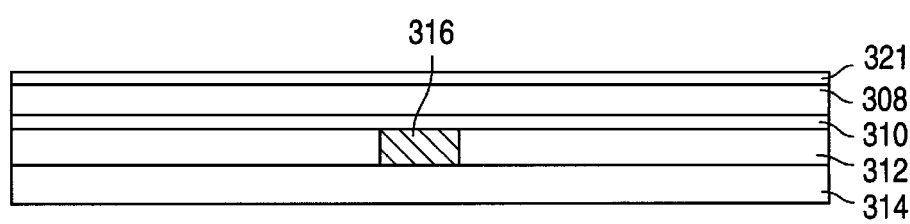
Figure 3F:
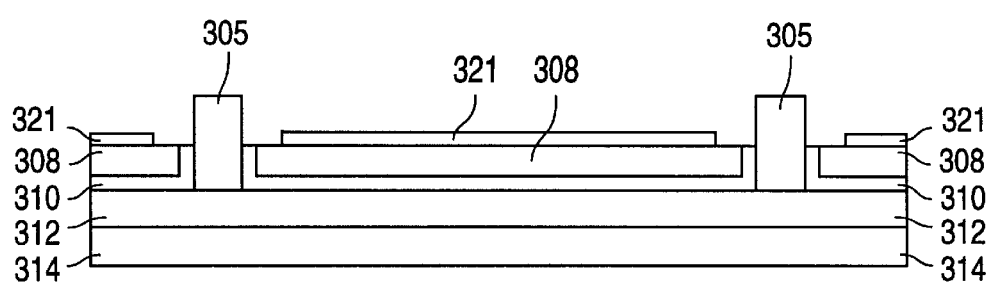

FIGS. 3FA–3FC illustrate etching to uncover silicon nitride pillars 305 from the $SiO_2$ film 321, Al/Cu layer 308, and Ti film 310 in which support pillars 305 are encased. In regions of the pixel cell unprotected by photoresist layer 340, etchant removes thin $SiO_2$ film 321 over support pillars 305 and then continues to etch downward, removing Al/Cu 308 and TiN layer 310 encasing support pillar 305. The progress of the etchant is controlled to cease just before penetrating the planar portion of Al/Cu layer 308 proximate to support pillar 305.

Figure 3G:
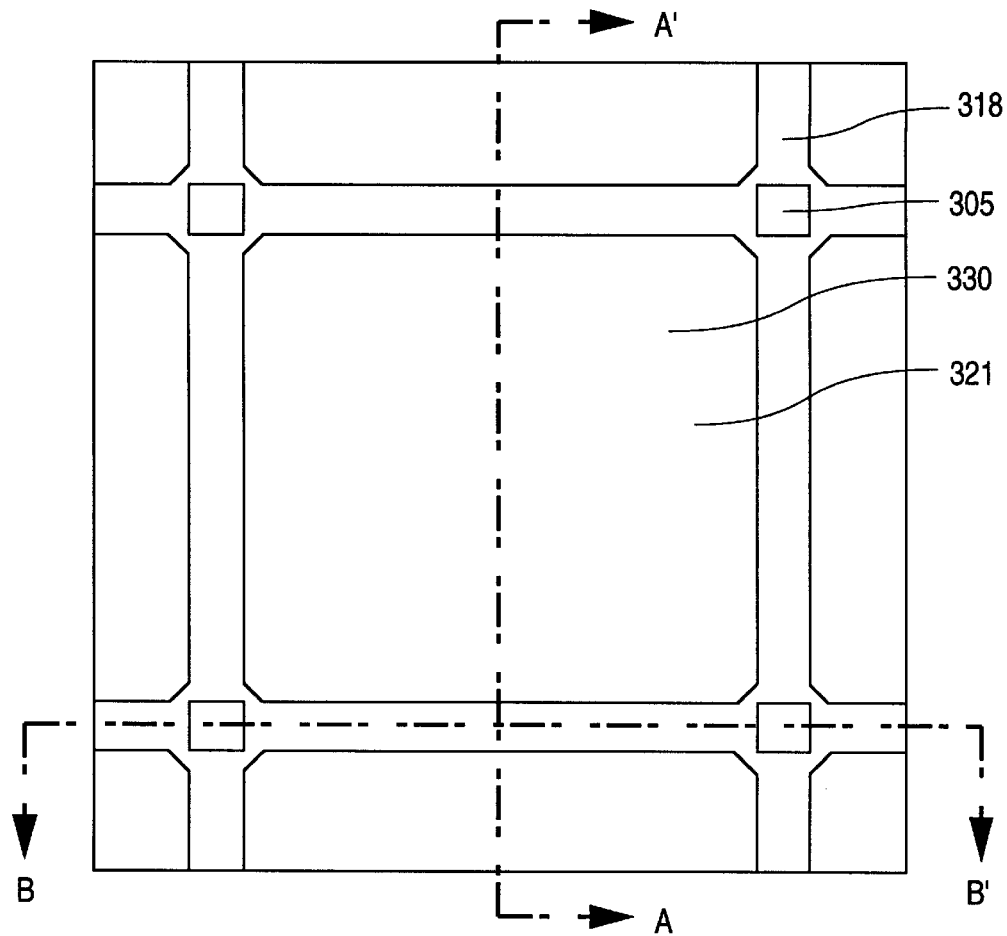
Figure 3G:
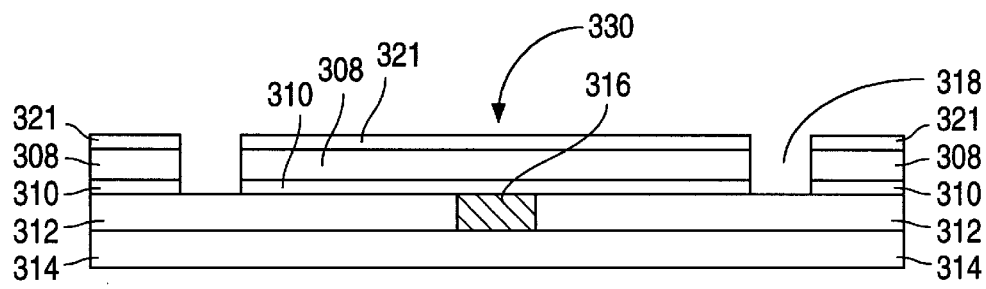
Figure 3G:
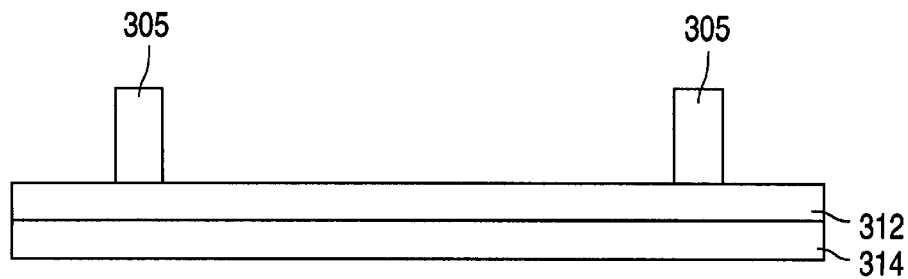

FIGS. 3GA–3GC illustrate the delineation of individual pixel cell electrodes 330 from underlying pixel electrode layer 306. In this step, a photoresist mask is patterned over the surface of the pixel cell, and exposed portions are etched to remove $SiO_2$ film 321, Al/Cu layer 308, and TiN film 310, thereby forming intersecting trenches 318. A plurality of pixel electrodes 330 are separated by trenches 318. The remaining photoresist is then stripped.

Fabrication of thin LC transducer pixel cell is completed by creating and scoring the alignment surface as discussed above in conjunction with the conventional process, followed by insertion of liquid crystal material and sealing the cell with a top glass plate.

The process for fabricating the thin LC transducer pixel cell in accordance with the present invention offers a number of important advantages over existing processes.

Figure 2D:
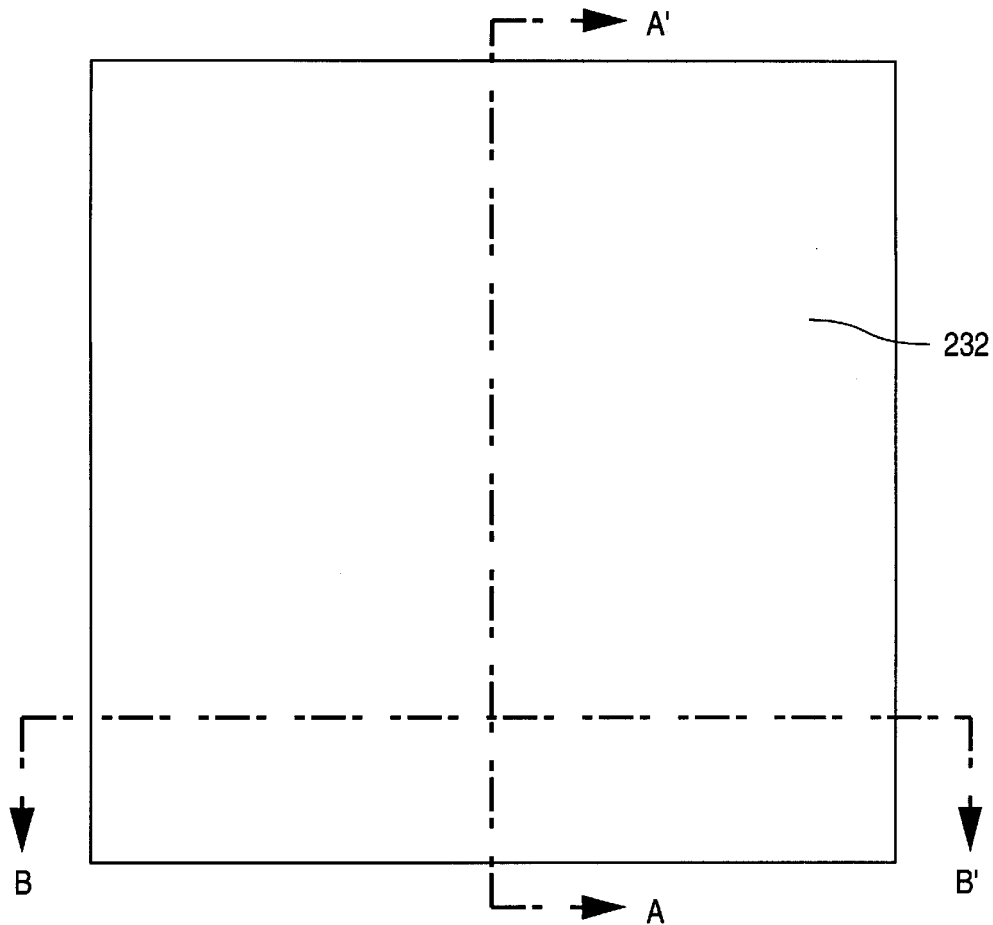
Figure 2D:
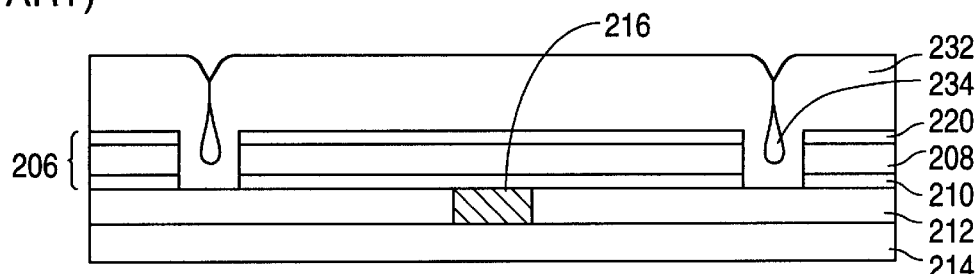
Figure 2D:
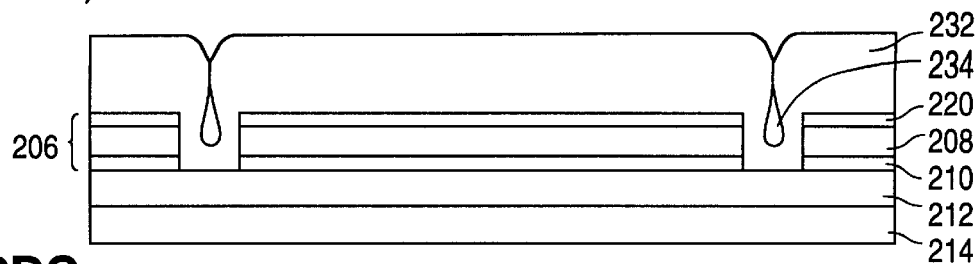
Figure 2E:
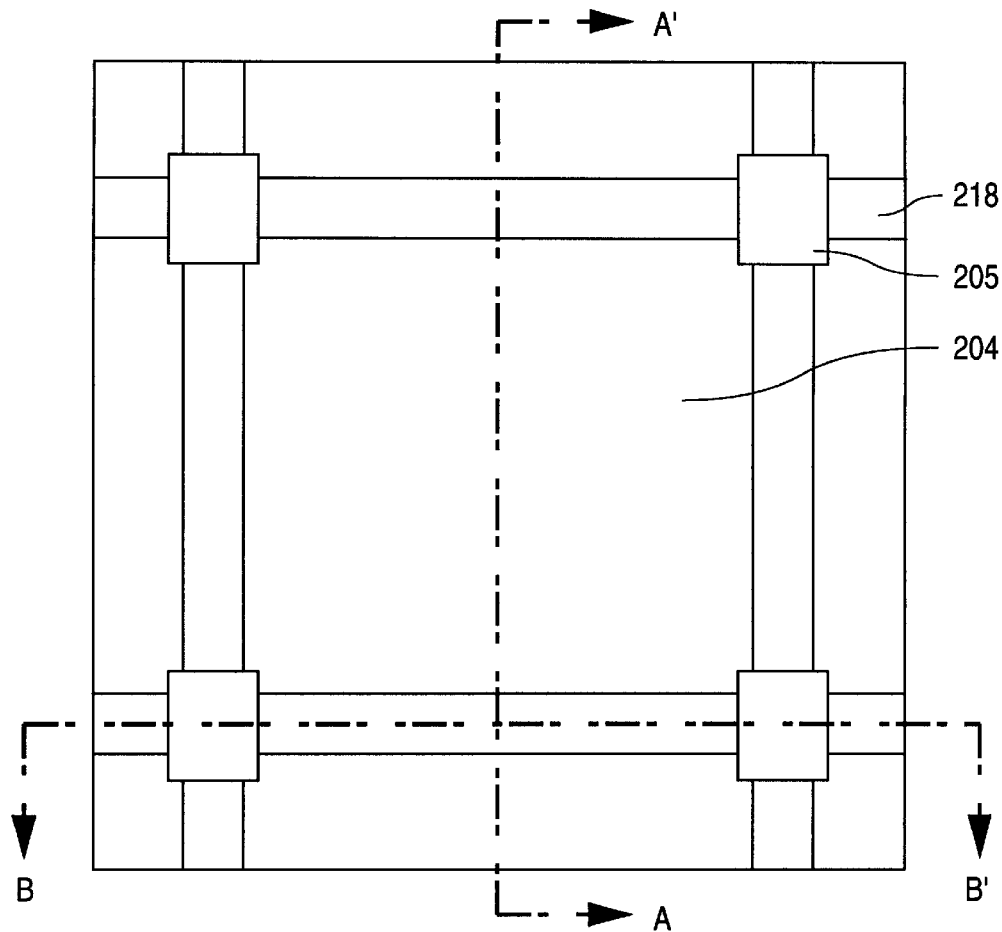
Figure 2E:
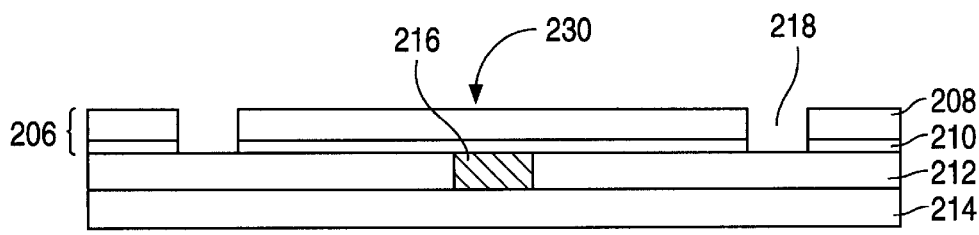
Figure 2E:
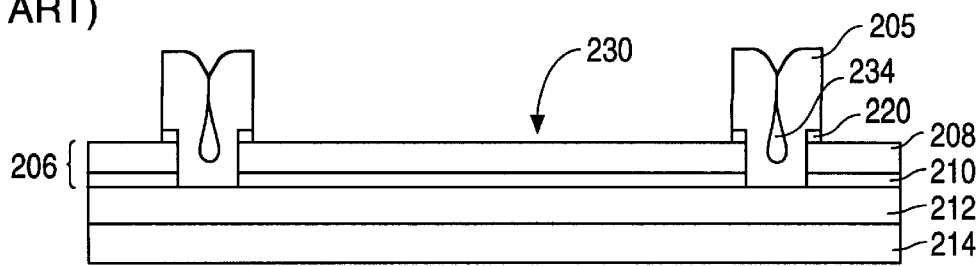

First, the dielectric layer 321 deposited over the pixel electrode in FIGS. 3DA–3DC is approximately one-sixth as thick as the thick dielectric layer 232 deposited over the pixel electrode in FIGS. 2DA–2DC. This difference in the thickness of the deposited dielectric layer means that the pixel electrode layer is subjected to less heat, inhibiting formation of hillocks which can degrade reflectance of a pixel cell formed using the conventional process.

A second advantage offered by the process in accordance with the present invention is that the surface of the pixel electrode layer is never exposed to etchant that could roughen or oxidize its surface and reduce reflectance. Rather, the pixel electrode layer is deposited last, and is masked from subsequent processing steps by a photoresist layer that is stripped under relatively benign conditions.

Moreover, the presence of the protective thin $SiO_2$ film above the Al/Cu metal layer ensures that the surface of the metal layer will not be roughened by subsequent process steps. And, as discussed above, the protective thin $SiO_2$ film also serves to enhance reflectance of the pixel cell electrode by generating constructive interference of light incident to the pixel cell.

A third advantage offered by the process in accordance with the present invention is the elimination of unwanted keyhole voids within the support pillars. As discussed above, keyhole voids form during deposition of dielectric into the existing narrow trenches. In the present process, silicon nitride or some other dielectric material is initially deposited directly onto the flat upper intermetal dielectric layer that is devoid of trenches. The trenches delineating the electrodes of the various pixel cells from the pixel cell electrode layer are formed only after creation of the support pillars. Thus, there is no formation of keyhole voids that could adversely affect the structural integrity of the support pillars.

Although the invention has been described in connection with one specific preferred embodiment, it should be understood that the invention as claimed should not be unduly limited to such specific embodiments. Various other modifications and alterations in the structure and method of operation of this invention will be apparent to those skilled in the art without departing from the scope of the present invention.

For example, while the process in accordance with the first embodiment of the present invention utilizes $Si_3N_4$ as the thick dielectric layer forming the support pillars, an alternative dielectric material, such as silicon dioxide, could also be utilized. In addition, the specific thicknesses of the various layers cited in the above detailed description could be varied, and the process would still remain within the scope of the present invention.

Furthermore, there may be some variation of the specific process steps outlined above. For example, FIGS. 3DA–3DC describe the reflow and etching of the photoresist to expose SiO$_2$ film on top of the encased support pillars prior to removal of the SiO$_2$, Al/Cu, and TiN encasing the support pillars. However, etching to expose the support pillars could also be accomplished by dispensing with the reflow step and simply masking photoresist directly in regions proximate to the SiO$_2$, Al/Cu, and Ti encased pillars.

Moreover, a thin LC pixel cell structure could be formed with the support pillar in the middle of the pixel cell and still remain within the scope of the present invention. Placement of the support pillar in this region of the pixel cell would cover the dimple in the electrode surface caused by the underlying via.

Therefore, it is intended that the following claims define the scope of the present invention, and that the methods and structures within the scope of these claims and their equivalents be covered hereby.

What is claimed is:

1. A method of forming an array of liquid crystal transducer pixel cells comprising the steps of:

forming a series of support pillars on top of an upper level of intermetal dielectric;

forming a pixel electrode layer on top of the support pillars and the upper level of intermetal dielectric; and forming a series of trenches in the pixel electrode layer to delineate individual pixel cell electrodes of individual pixel cells of the array.

2. The method according to claim 1 wherein the step of forming a series of support pillars on top of an upper level of intermetal dielectric further comprises the steps of:

forming a layer of dielectric material, patterning a layer of photoresist on top of the dielectric material, and etching the layer of dielectric material to form a series of pillars.

3. The method according to claim 2 wherein the step of forming a layer of dielectric material comprises depositing a layer of silicon nitride approximately 15,000 Å deep.

4. The method according to claim 2 wherein the step of forming a layer of dielectric material comprises forming a layer of silicon dioxide.

5. The method according to claim 2 wherein the step of forming a pixel electrode layer on top of the support pillars and the upper level of intermetal dielectric further comprises the steps of:

forming a thin adhesive film, forming a central metal layer on top of the thin adhesive film, forming a dielectric film on top of the central metal layer, and removing the thin adhesive film, the central metal layer, and the dielectric film on top of and adjacent to the support pillars.

6. The method according to claim 5 wherein the step of forming an adhesive film includes depositing a Ti film having a thickness of approximately 300 Å, the step of forming a central metal layer on top of the support pillars and the upper level of intermetal dielectric includes forming an Al/Cu mixture having a thickness of approximately 5000 Å, and the step of forming a dielectric film on top of the central metal layer includes forming a silicon dioxide layer having a thickness of approximately 1600 Å.

7. The method according to claim 5 wherein the step of removing the thin adhesive film, the central metal layer, and the dielectric film on top of and adjacent to the support pillars further includes the steps of forming a layer of photoresist above the dielectric film, patterning a mask in the photoresist that excludes the support pillars and regions immediately surrounding the support pillars, and etching through unmasked photoresist, the dielectric film on top of the silicon pillars, and the central metal layer and adhesive film underneath the unmasked photoresist.

8. The method according to claim 5 wherein the step of removing the thin adhesive film, the central metal layer, and the dielectric film on top of and adjacent to the support pillars further includes the steps of:

reflowing the photoresist layer to expose a portion of the dielectric film lying on top of the silicon pillars, and etching through the portion of the dielectric film lying on top of the silicon pillars, and the central metal layer and the adhesive film underlying the portion of the dielectric film lying on top of the support pillars.

* * * * *